United States Patent
Yeggy (10) Patent No.: US 7,021,720 B1
(45) Date of Patent: Apr. 4, 2006

(54) TILL TRACK VEHICLE

(76) Inventor: Wilfred Yeggy, 834 St. Ann's Dr., Iowa City, IA (US) 52245

( * ) Notice: Subject to any disclaimer, the term of this patent is extended or adjusted under 35 U.S.C. 154(b) by 0 days.

(21) Appl. No.: 10/636,414

(22) Filed: Aug. 7, 2003

(51) Int. Cl.
*B60B 15/02* (2006.01)
*E01C 19/26* (2006.01)

(52) U.S. Cl. .................. 301/44.4; 180/16; 404/124

(58) Field of Classification Search ............. 180/900, 180/9, 9.1, 9.21, 9.26, 9.28, 9.3, 9.62, 208, 180/7–1, 16, 15; 404/124, 122; 301/44.4, 301/43, 41.1
See application file for complete search history.

(56) References Cited

U.S. PATENT DOCUMENTS

| | | | | |
|---|---|---|---|---|
| 3,133,598 A | * | 5/1964 | Caldwell | 172/51 |
| 3,477,535 A | * | 11/1969 | Wyatt | 180/20 |
| 3,570,604 A | * | 3/1971 | Allard et al. | 172/22 |
| 3,926,240 A | * | 12/1975 | Nickerson, Jr. | 152/226 |
| 4,124,079 A | * | 11/1978 | Crow | 172/114 |
| 4,448,274 A | * | 5/1984 | van der Lely | 180/15 |
| 4,522,267 A | * | 6/1985 | Lewison | 172/28 |
| 4,535,859 A | * | 8/1985 | van der Lely | 180/15 |
| 4,560,019 A | * | 12/1985 | Barber | 180/9.32 |
| 4,765,637 A | * | 8/1988 | van der Lely | 172/47 |
| 4,982,799 A | * | 1/1991 | Fujimoto et al. | 172/2 |
| 5,046,785 A | * | 9/1991 | Bockerman | 301/52 |
| 5,634,752 A | * | 6/1997 | Haage et al. | 411/82 |

OTHER PUBLICATIONS

A Soil Primer—Compaction Causes and Effects, Ward B. Voorhees, Crops and Soils Magazine, Dec. 1986, pp. 8–11.
Indiana Soil Compaction Research, Gary Steinhardt, Iowa State University Cooperative Extension Service, Dec. 1984.
Soil Compaction: Causes, Concerns and Cures, R.T. Schuler, B. Lowery, R.P. Wolkowski and L.G. Bundy, University of Wisconsin Cooperative Extension Service.
Effects of Tractor Tracks During Secondary Tillage on Corn Production, D.C. Erbach, S.W. Melvin, R.M. Cruse, American Society of Agricultural Engineers, Dec. 1988.
Challenger Wide-Track Tractors brochure, Caterpillar, Inc., 1997.
Managing Soil Compaction brochure, Caterpillar, Inc., 1996.

* cited by examiner

*Primary Examiner*—Christopher J. Novosad
(74) *Attorney, Agent, or Firm*—Simmons, Perrine, Albright & Ellwood, PLC (57) ABSTRACT

A vehicle that uses a steel lug wheel assembly while in the field and has retractable rubber tires for transport on paved roads. The vehicle is capable of simultaneously performing multiple farm operations in a field. The multiple farm operations include shredding, chiseling, tilling, as well as pulling any farm implement device such as a planter or a fertilizer.

9 Claims, 6 Drawing Sheets

TILL TRACK VEHICLE

BACKGROUND OF THE INVENTION

This invention relates generally to farm or construction equipment and more specifically to a vehicle that uses a steel lug drive assembly and can perform multiple farming operations simultaneously.

Soil compaction is becoming a problem for many farmers. The fact that field machines are becoming increasingly heavier combined with the desire for farmers to enter their fields early in the spring when the ground is wet, both add to soil compaction. Because compacted soil has fewer channels for water to seep through, water entering compacted soil is drastically reduced. This causes greater surface wetness and more runoff, which in turn increases erosion. Furthermore, compacted soil does not allow plant roots to spread through the soil, which contributes to inadequate moisture and nutrients reaching the plant. The bottom line for farmers is that soil compaction reduces crop yield.

Farmers have a desire to enter their fields early in the spring to begin preparing their fields and plating crops. However, the wet soil that generally comes with the spring thaw creates problems for farmers. Compaction increases as soil wetness increases. Therefore, in order to maximize yields for the season, farmers are advised to stay out of the fields until soil wetness decreases. However this adversely affects farmers in that it shortens their crop growing season. Purdue University has determined that the value of planting during an optimum two-week period is worth $475 an hour in the Corn Belt.

There are many factors that contribute to soil compaction such as machine weight, tire size, tire inflation pressure, and the number of passes a tractor must make over the soil during a season. There have been several attempts in the agricultural industry to solve the problem of soil compaction. U.S. Pat. No. RE37,174 describes a way to increase traction while decreasing soil compaction by using an "endless" belt or track on either side of the vehicle for propulsion, similar to that used with bulldozers or army tanks. RE37,174 teaches that less soil compaction will occur if a vehicle is allowed to spread its weight over a greater surface area of the ground.

Using similar logic, some farmers try to increase traction and minimize soil compaction by adding more pneumatic or solid rubber tires to their axels so that instead of two tires per axel, there are four or six tires per axel. This is done in an attempt to create more surface area with which the tractor is contacting the ground. However, because pneumatic tires need ballast weight in order to achieve the level of traction needed to pull farm implement devices, adding tires to an axel can have an adverse effect on soil compaction because more ballast weight must be added for each additional tire on the axel, and thus the overall weight of the vehicle increases. The heavier the vehicle, the more it causes soil compaction.

The problem of soil compaction relates closely to the problem of traction. Generally pneumatic tires are not very efficient. As stated in the previous paragraph, pneumatic tires need ballast weight in order to achieve a desired amount of traction. This is especially true for pneumatic tires on wet soil. In order for a pneumatic tire to be effective, it must operate at a considerable rate of slippage in order for the soil to build up under the tire so as to produce thrust for propulsion. This is because a typical pneumatic tire is sensitive only to surface soil.

Traction problems are compounded when the tractor pulls a farm implement device such as a chisel. Current chisel systems actually reduce the amount of traction achieved by tractors. The chisels that dig into the ground are located on the rear of the implement device, while a hitch on the front of the device attaches it to the tractor. As the vehicle moves forward pulling the chisels, the chisels at the rear of the implement device are pulled into the ground. This causes the implement device to pivot using the axel of its wheels as the pivot point, and thus the hitch portion of the implement device is pushed away from the ground. This hitch portion is attached to the rear of a tractor, which is also pushed away from the ground, giving the rear of the tractor less traction.

In addition to compaction and traction problems, farmers must fight insects that destroy their crops. Many farmers use chemicals to try to get rid of the insects and other bugs that prey on their crops. However, chemicals can be harmful to the environment, especially in high concentrations. Recently it has been found that insects build up resistances to chemicals so that the concentration of chemicals used must be increased over time to achieve the same level of results.

Therefore there is a need for a farm vehicle that minimizes soil compaction, increases traction, and provides alternative methods of killing insects that prey on crops.

It is therefore an object of this invention to maximize traction of a farm vehicle while minimizing soil compaction by way of a steel lug drive assembly.

It is further an object of this invention to reduce the amount of chemicals used on crops by employing a steel lug drive assembly that penetrates the soil and leaves it with a rough surface, which helps prevent erosion and retards weeds.

It is further an object of this invention to minimize soil compaction by combining several farm tools onto one vehicle and thus requiring fewer passes over the soil during a season.

It is further an object of this invention to aid in the destruction of root worms by tilling the soil deep enough to aid in the destruction of their habitat, thereby reducing the need for chemicals.

It is further an object of this invention to enrich the soil nutrient base by mixing the shredded materials into the soil with the roto-tiller.

SUMMARY OF THE INVENTION

The present invention generally includes a chassis, a front and rear drive assembly, a shredder, a spring-tooth chisel, and a roto-tiller. The chassis is similar to that of an ordinary farm tractor. The front and rear drive assemblies contact the ground and produce propulsion for the vehicle while it is in the field. The front and rear drive assemblies are comprised of a round drum-like hub from which steel lugs protrude. It is these lugs which come into contact with the ground causing thrust to build up for propulsion of the vehicle. The lugs penetrate the soil causing it to be broken up instead of compacted. The front and rear drive assemblies allow the vehicle to enter the fields earlier in the spring because the vehicle has more traction and does not compact the soil in the same manner as a vehicle resting on pneumatic or hard rubber tires. The drive assemblies also provide traction advantages when the fields are wet, snowy, or icy.

Retractable rubber transport wheels are used for propelling the vehicle on finished roadways. The retractable transport wheels can be raised when the steel lug drive assemblies are required in the field, and lowered for transporting the vehicle on roadways. These wheels are necessary because heavy machines that use steel to contact the ground as their drive mechanism are not able to travel on improved road surfaces without inflicting unacceptable damage.

The present invention further includes a depth gauge for maintaining the shredder at the proper soil depth; a shredder for shredding all materials ahead of the machine such as weeds and corn stalks; a chisel system for tilling and breaking up the soil; a roto-tiller for chopping up plant roots and for mixing the shredded material into the soil; and a rear tool bar for attaching any farm implement tool the user requires, such as a planter, fertilizer, or ripper. The present invention allows the farmer to perform multiple farming operations simultaneously which minimizes the number of times the farming vehicle will have to pass over the soil during a season. This reduces soil compaction as well as saves the farmer time and money.

DESCRIPTION OF THE PREFERRED
EMBODIMENT OF THE INVENTION

Figure 1:
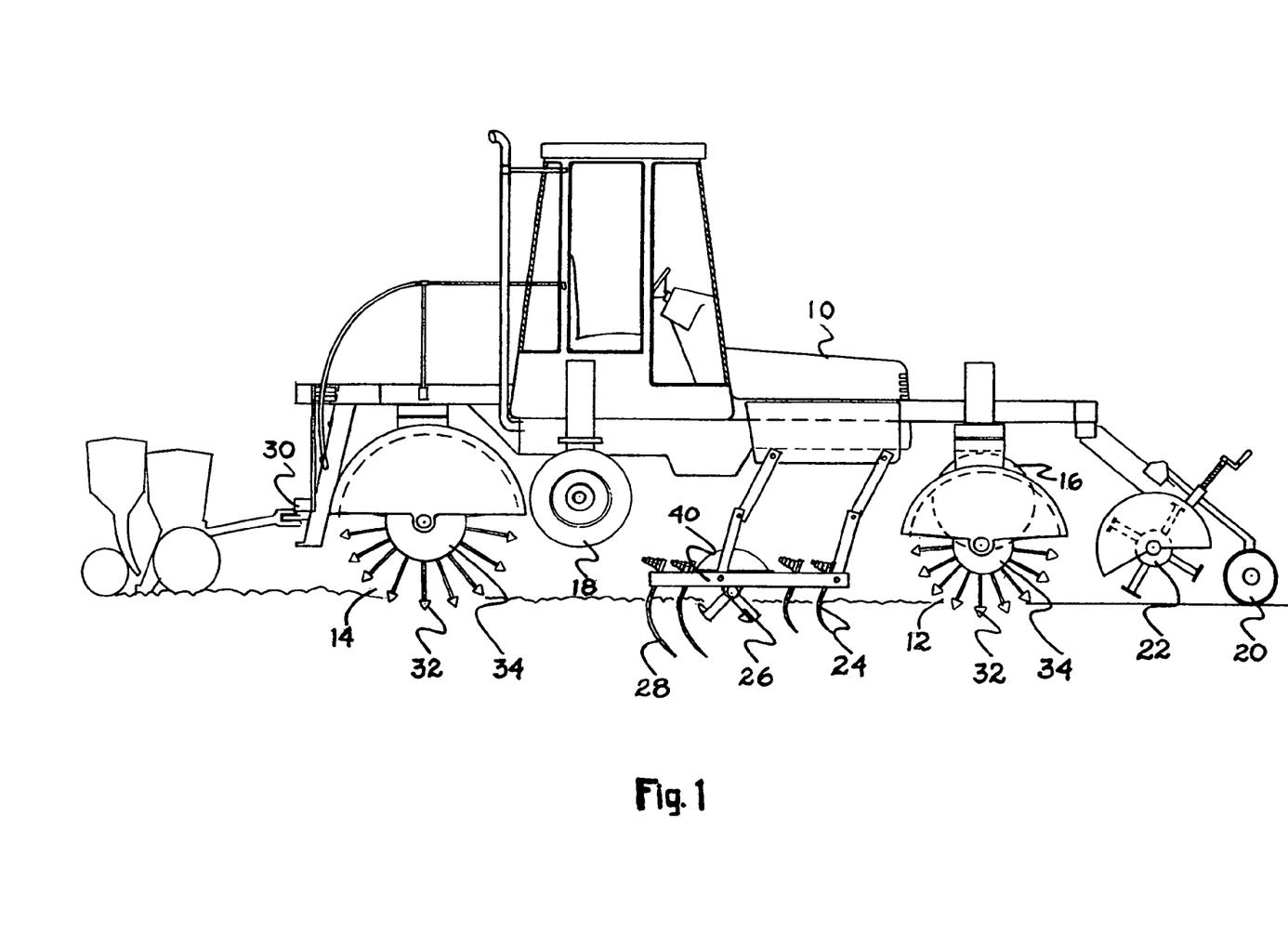
FIG. 1 is a side view of the equipment of the instant invention.
Figure 2:
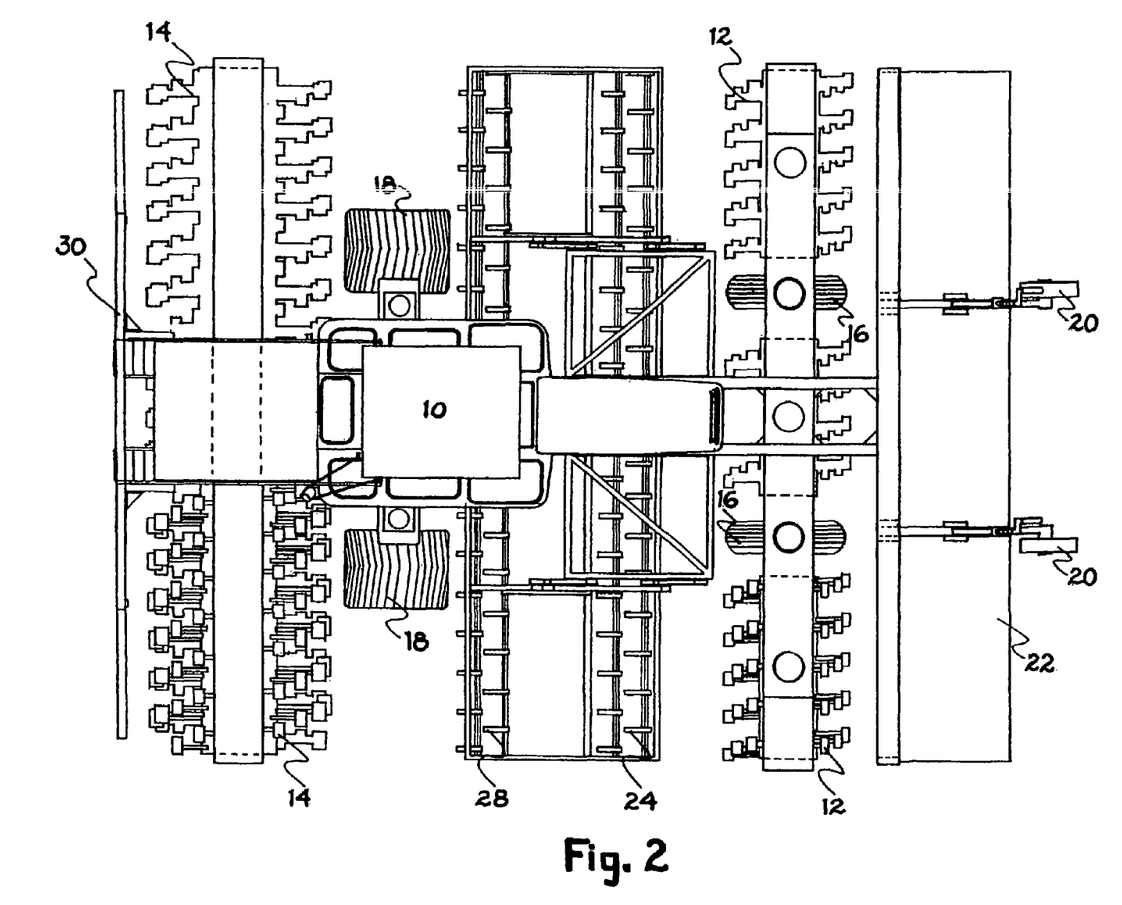
FIG. 2 is a top view of the equipment of the instant invention.
Figure 3:
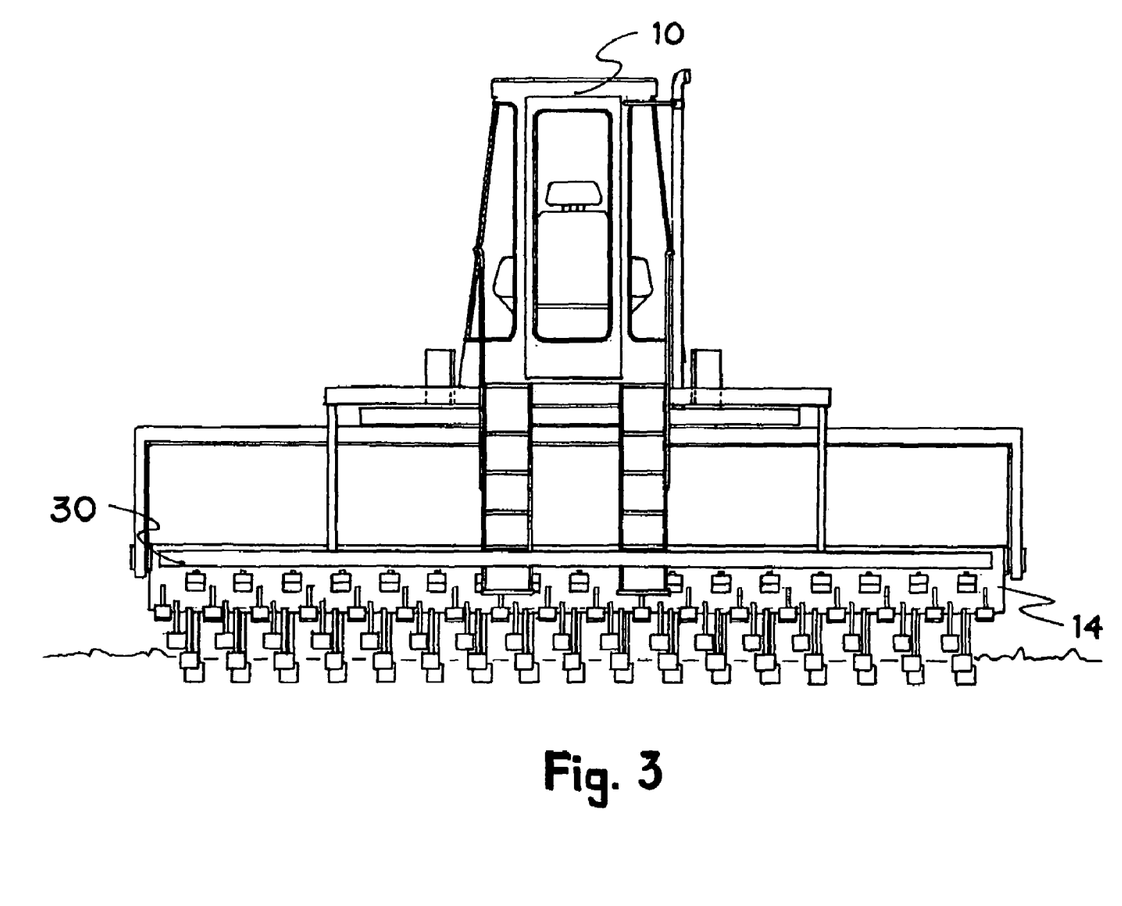
FIG. 3 is a rear view of the equipment of the instant invention.
Figure 4:
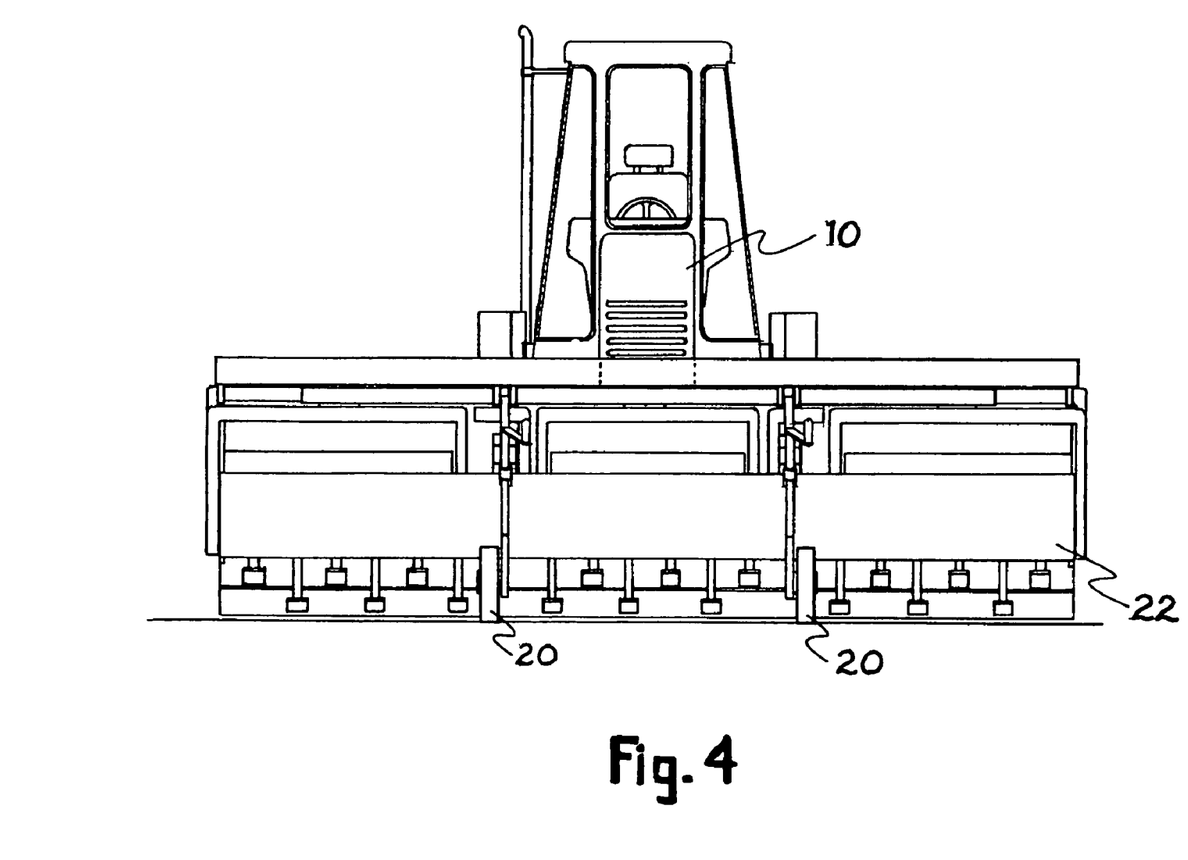
FIG. 4 is a front view of the equipment of the instant invention.

FIGS. 1 and 2 show a side and a top view of the farm implement vehicle of the present invention, respectively. The farm implement vehicle comprises a chassis 10 and a power means such as a gasoline engine (not shown) for powering the drive assemblies 12, 14, and the transport wheels 16, 18. The front and rear drive assemblies 12, 14 are similar in design, and can be seen in both FIGS. 1 and 2. Both assemblies are comprised of a round drum-like hub 34 from which steel lugs 32 protrude. The front drive assembly 12 differs from the rear drive assembly 14 in that it uses smaller lugs 32, is smaller in diameter, and is steerable by the operator of the vehicle. In the preferred embodiment, the rear drive assembly 14 contains a differential so as to not excessively dig into the soil on one side of the vehicle during a turn. Although the front and rear drive assemblies 12, 14 may be broken into different sections for steering and differential purposes, the drive assemblies 12, 14 are between eight and twenty-four feet wide, as best seen in FIG. 2. In the preferred embodiment, the drive assemblies 12, 14 are eighteen feet wide.

Figures 6, 8:
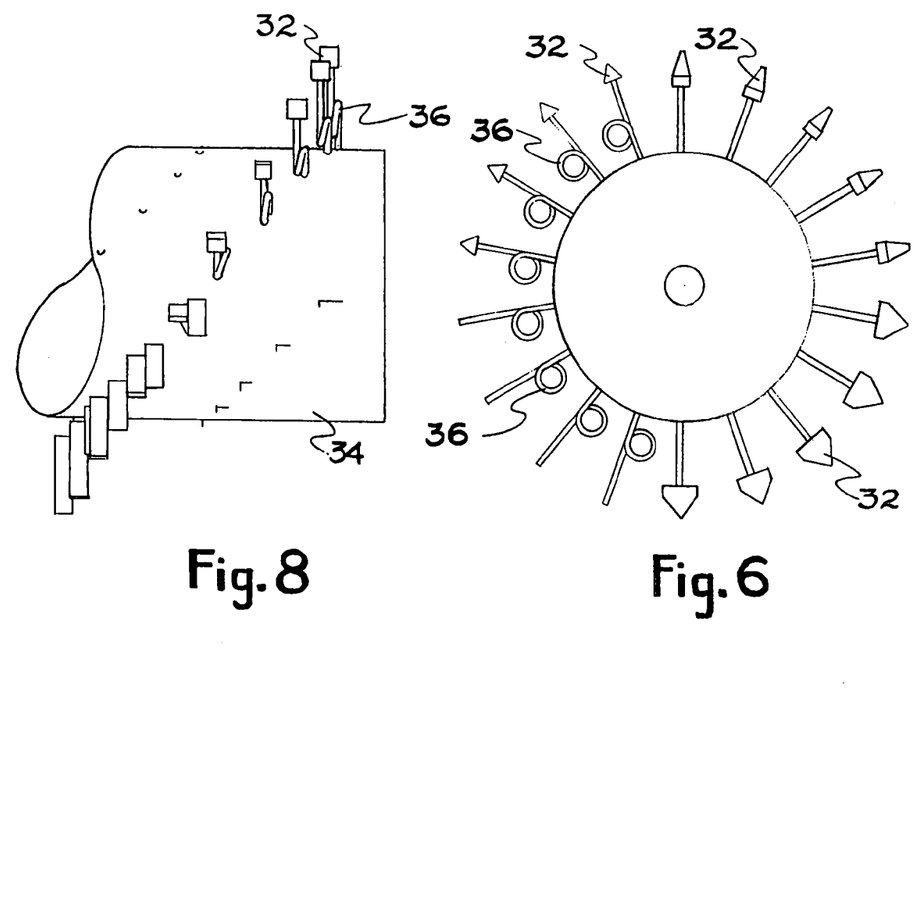
FIG. 6 is a perspective view of different lug styles.
FIG. 8 is a perspective view of the drive assembly showing how the lugs are arranged in a spiral fashion and showing how the lugs are mounted on spring shanks.
Figure 7:
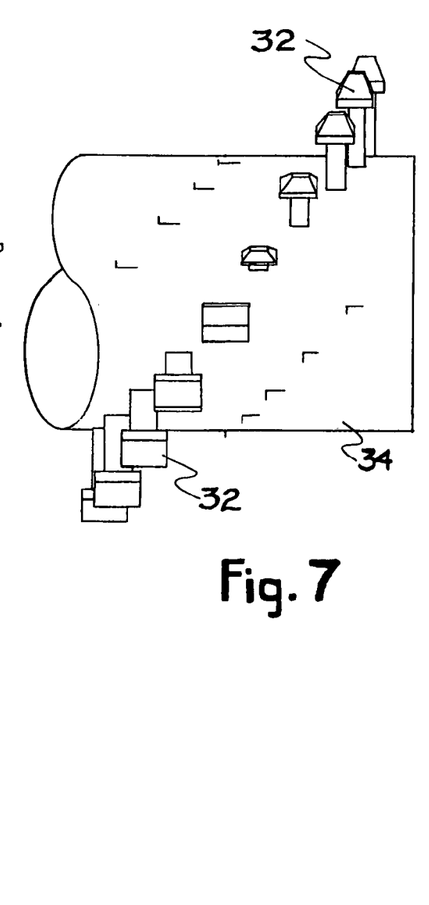
FIG. 7 is a perspective view of the drive assembly showing how the lugs are arranged in a spiral fashion.

The lugs 32 that protrude from the drum-like hub 34 make contact with the ground causing thrust to build up for propulsion of the vehicle. The lugs 32 penetrate the soil causing the soil to be broken-up instead of compacted. The steel lugs 32 penetrate into the stronger sub-surface soil layer. This allows the vehicle to have increased traction without adding ballast weight (necessary with pneumatic tires), which causes compaction. Because of the increased traction, the steel lug drive assemblies 12, 14 are also capable of transmitting propulsion power at a much lower rate of slippage than compared with rubber tires. As shown in FIGS. 7 and 8 the lugs 32 are spaced apart so that they are aligned in a spiral fashion around the hub 34. The spiral design of the lugs 32 creates a repeating pattern of alternating lugs 32 whereby a number of lugs 32 contact the ground at one time; however, the spiral design is such that any two lugs 32 next to each other are not in contact with the ground at the same time. This minimizes lateral soil compaction. Although the presently preferred embodiment employs the drive assemblies 12, 14 on a vehicle similar to that of a farm tractor, the drive assemblies 12, 14 can be employed in any type of farming or construction vehicle.

A number of different lug 32 designs can be used with the present invention. The lugs 32 are generally made of steel or any suitable metal, with a head in the shape of a point on the end of a shaft that protrudes away from the hub 34. The head of each lug 32 is several inches long, with three inches being the preferred length for the front assembly 12, and four inches being preferred for the rear assembly 14. FIGS. 6 and 7 show different lug 32 designs that vary in length and width allowing for more or less soil penetration depending on soil type, preference, and vehicle weight. For example, on harder soil or with a lighter vehicle, a more pointed lug 32 may be preferred so as to more easily penetrate the soil. While in softer soil or with a heavier vehicle, a less pointed lug 32 may be preferred. This is because the less pointed the lug 32, the more surface area contacts the ground, thus being capable of holding more weight. In the preferred embodiment, the lugs 32 are mounted on stiff springs 36, as shown in FIG. 8, so as to provide some flexibility to the lugs 32 and protect them from breaking if they contact rocks in the soil.

The invention also contains front and rear retractable transport wheels 16, 18 for transporting the vehicle on paved roadways. These transport wheels 16, 18 can be raised when the steel lug drive assemblies 12, 14 are required in the field, and lowered for transporting the vehicle on roadways. In the preferred embodiment, the vehicle of the present invention changes from using the lug drive mechanism 12, 14 to the transport wheel 16, 18 drive mechanism by hydraulically lowering the transport wheels 16, 18 far enough that the weight of the vehicle is transferred from the lug drive mechanism 12, 14 to the transport wheel 16, 18 drive mechanism. The vehicle then can change back to using the lug drive mechanism 12, 14 by hydraulically raising the transport wheels 16, 18 until the weight of the vehicle is on the lug drive mechanism 12, 14. These transport wheels 16, 18 can be pneumatic, made of solid rubber, or made of any other suitable material that does not damage finished roadways. They are necessary because heavy machines that use steel on the wheels as their drive mechanism are not able to travel on improved road surfaces without inflicting unacceptable damage.

The invention further cuts down on soil compaction by allowing multiple farm operations to be performed simultaneously during one pass of the vehicle through the field. In the preferred embodiment, the agricultural attachments described in association with this invention operate under hydraulic power given by the vehicle. However, in alternative embodiments, the agricultural attachments may include separate power generating means for their operation. One such agricultural attachment device is a shredder 22. In the present invention, a removable shredder 22 is mounted near the front of the vehicle. Combined with the shredder 22 is a depth gauge 20 which monitors and maintains the proper depth of the shredder 22 relative to the ground. A number of different kinds of shredders can be used with this invention;

however a swing arm shredder is preferred. The shredder 22 can be used at any time, but is usually used in the fall to cut down any material ahead of the vehicle, such as weeds or corn stalks. The direction of the shredder's 22 spinning action helps drive the vehicle forward as it cuts through material.

The invention also includes a front and a rear chisel 24, 28 system mounted under the chassis 10. A plurality of chisels are mounted under a deck 40 that is eighteen feet wide in the preferred embodiment. The deck 40, with the chisels 24, 28 attached, can be raised or lowered as desired, preferably by hydraulic power. In the preferred embodiment, the chisel systems 24, 28 can be mounted on springs so as to provide flexibility to the chisels 24, 28 and protect them from rocks that may be encountered in the soil. The front chisel 24 tills the soil to a depth of about ten to fourteen inches. This aids in the destruction of root worm habitat thereby reducing the need for chemicals, which saves expense to the farmer and helps preserve the environment. The rear chisel 28 tills the soil to a depth of about sixteen to twenty-two inches to break up deep soil compaction, which allows water to seep into the soil thereby preventing water run-off and erosion. Crops benefit from this because it is easier for plant roots to grow in less compacted soil and thus they are more capable of absorbing nutrients and water from the soil.

The preferred embodiment further maximizes traction by mounting the chisel systems 24, 28 under the chassis 10 as opposed to having chisels pulled behind the vehicle. Traction is increased because as the vehicle moves, the chisels pull into the ground and this in turn pulls the front and rear drive assemblies 12, 14 toward the ground. The disadvantages of pulling a chisel behind a tractor (as opposed to underneath a tractor) are described in the "Background" section of this specification.

A rotary tiller 26 is also attached to the deck 40 and is positioned between the front and rear chisel systems 24, 28. The tiller 26 can also be raised or lowered with the movement of the deck 40, which, as previously described, is done preferably under hydraulic power supplied by the vehicle. The tiller 26 chops up any plant roots as well as mixes the material cut down by the shredder 22 into the soil which enriches the nutrient base of the soil. Tilling the dead corn stalks underground makes it much more difficult for the corn bore to survive in the corn stalks. Furthermore, as the tiller 26 turns and mixes the soil, its spinning action helps drive the vehicle forward.

The rotary tiller 26 can be run in either the forward or the reverse direction. In the reverse direction the rotary tiller 26 operates as a leveling machine to level the ground.

The vehicle in the present invention has a tool bar 30 behind the rear drive assembly 14 which allows the user to attach any farm implement device he/she wishes. Therefore, in addition to simultaneously performing all of the above described operations, the vehicle can pull a planter, a fertilizer, a ripper, or any other implement device which can attach to the tool bar 30. This saves time and allows for fewer total passes through the field in a season, which minimizes soil compaction and saves time.

Figure 5:
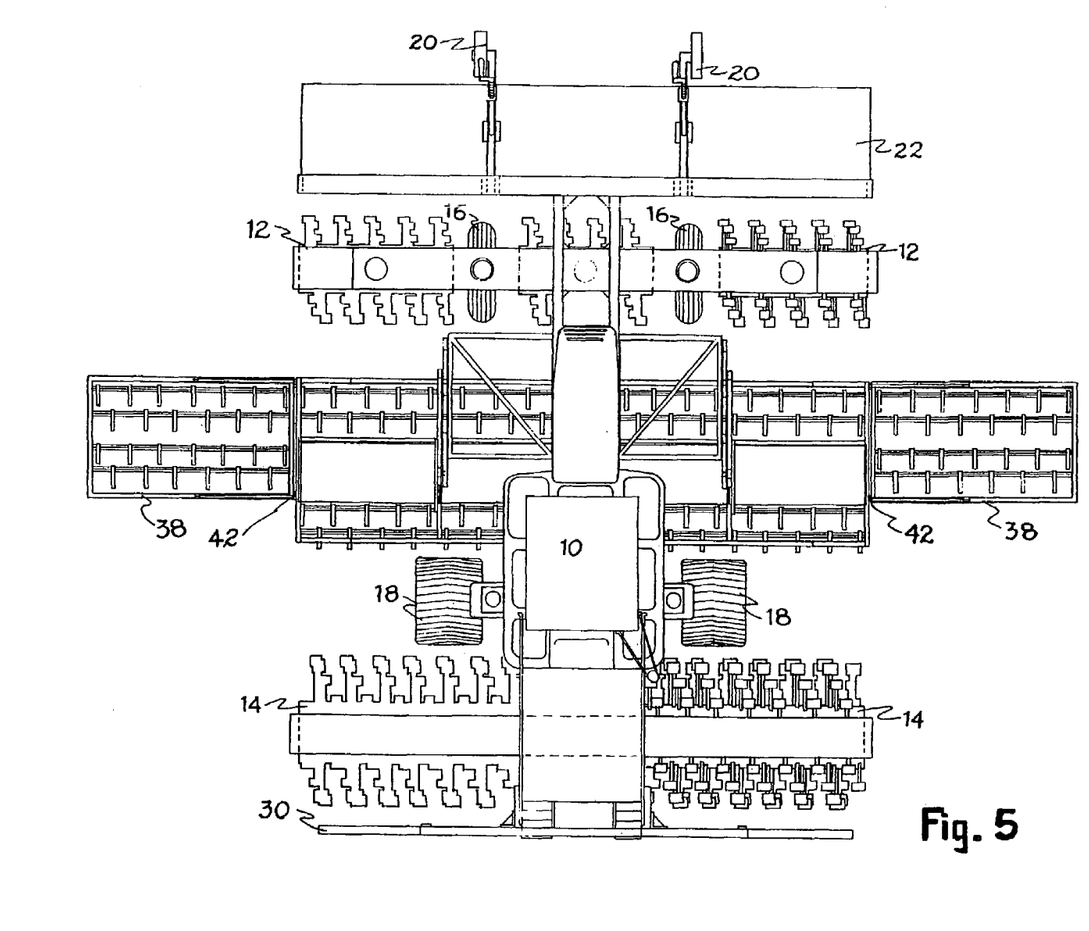
FIG. 5 is a top view of the equipment of the instant invention shown with extension wings.

The vehicle has removable, retractable, wings 38 on which can be attached any of the above implement devices, such as a planter or a spring-tooth harrow. The wings 38 retract to an upright position under hydraulic power by being removably attached to the deck 40 or the vehicle chassis 10 by a hinge 42. The wings 38 are preferably attached to the deck 40 so that the wings 38 raise and lower simultaneously with the chisel system 24, 28. In the preferred embodiment, the wings 38 comprise a spring-tooth harrow, which operates as a fine chisel system to smooth the soil. These wings 38 allow the vehicle to make a wider pass over the field and thus reduce the total number of passes the vehicle must make over the soil. This minimizes soil compaction. The preferred embodiment comprises wings 38 that can fold out so that the total width of the machinery (wingspan) is thirty-four feet, or retract to an upright position allowing the vehicle easier transport on roads. In the preferred embodiment, each retractable wing 38 extends eight feet on either side of the vehicle. In order to use the spring-tooth harrow in the spring season, the soil must have been tilled in the fall so that the spring-tooth harrow is used as a "finishing tool" for the soil.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A vehicle comprising:
    a chassis having a top and a bottom;
    a front and rear drive assembly combined with the chassis, each drive assembly having a hub and a plurality of lugs which protrude from the hub, the front drive assembly being steerable;
    a front and rear transport system combined with the chassis, each transport system having retractable wheels which retract with respect to the chassis, the front transport system's wheels being steerable;
    an energy source for powering the drive assemblies and the transport systems;
    wherein the lugs are soil-penetrating lugs made of steel;
    wherein the lugs protrude at least three inches from the hub and are offset from each other along the length of the hub so that each lug penetrates the soil at a different point; and
    wherein the lugs are mounted onto the hub with springs so as to dispel rocks and in a pattern so that a plurality of lugs form a line of lugs extending across a width of the hub.

2. The vehicle of claim 1 wherein the drive assemblies are between 8 and 24 feet long and the retractable wheels are hydraulically raised or lowered vertically with respect to the chassis.

3. The vehicle of claim 2 further comprising:
    a detachable chopping shredder mounted onto the front of the chassis; and
    a detachable depth gauge mounted onto the front of the chassis to monitor and control the height of the shredder relative to the ground.

4. The vehicle of claim 3 further comprising a retractable deck combined with the underside of the chassis capable of raising and lowering relative to the ground wherein a tiller is combined with the deck.

5. The vehicle of claim 4 wherein the tiller is a rotary tiller.

6. The vehicle of claim 5 wherein a front and rear retractable chisel system is combined with the deck.

7. The vehicle of claim 6 wherein the chisel systems are spring tooth chisel systems.

8. The vehicle of claim 7 further comprising a rear tool bar combined with the rear of the chassis for attachment of a farm implement device.

9. The vehicle of claim 4 further comprising a detachable folding wing combined with the deck on each side of the chassis capable of carrying a chisel system on its underside, said wing for increasing the area of soil capable of being worked at one time.

* * * * *